United States Patent
Nakamura et al.

(10) Patent No.: US 11,332,184 B2
(45) Date of Patent: May 17, 2022

(54) ROTARY ELECTRIC MACHINE CONTROL DEVICE AND METHOD

(71) Applicant: DENSO CORPORATION, Kariya (JP)

(72) Inventors: Kouichi Nakamura, Kariya (JP); Nobuyori Nakazima, Kariya (JP)

(73) Assignee: DENSO CORPORATION, Kariya (JP)

( * ) Notice: Subject to any disclaimer, the term of this patent is extended or adjusted under 35 U.S.C. 154(b) by 98 days.

(21) Appl. No.: 16/851,430

(22) Filed: Apr. 17, 2020

(65) Prior Publication Data

US 2020/0353974 A1 Nov. 12, 2020

(30) Foreign Application Priority Data

May 7, 2019 (JP) .............................. JP2019-087444

(51) Int. Cl.
*B62D 5/04* (2006.01)
*H02P 6/28* (2016.01)

(52) U.S. Cl.
CPC .............. *B62D 5/0463* (2013.01); *H02P 6/28* (2016.02); *B62D 5/0412* (2013.01)

(58) Field of Classification Search
CPC .......... H02P 21/22; H02P 29/032; H02P 6/12; H02P 5/46; B62D 5/0481; B62D 6/002
See application file for complete search history.

(56) References Cited

U.S. PATENT DOCUMENTS

| | | | | |
|---|---|---|---|---|
| 10,766,523 | B2 * | 9/2020 | Itou ..................... | B62D 5/0484 |
| 2009/0079375 | A1 | 3/2009 | Suzuki | |
| 2018/0015947 | A1 * | 1/2018 | Akatsuka ............. | B62D 5/0463 |
| 2018/0154929 | A1 * | 6/2018 | Nejo ...................... | B62D 1/286 |
| 2018/0178834 | A1 * | 6/2018 | Moreillon ............. | B62D 1/286 |
| 2019/0016378 | A1 | 1/2019 | Itou et al. | |
| 2019/0202498 | A1 * | 7/2019 | Karve ..................... | H02P 21/22 |
| 2019/0263446 | A1 * | 8/2019 | Tsubaki ............... | B62D 5/0463 |
| 2019/0337556 | A1 * | 11/2019 | Tsubaki ............... | B62D 15/025 |
| 2020/0391790 | A1 * | 12/2020 | Kamemura ......... | B62D 5/0457 |
| 2021/0046974 | A1 * | 2/2021 | Ootake ............... | B62D 5/0463 |

FOREIGN PATENT DOCUMENTS

JP 5109554 B2 12/2012
WO 2017/122562 A 7/2017

OTHER PUBLICATIONS

U.S. Appl. No. 16/851,465, dated Apr. 17, 2020, filed Apr. 17, 2020, Nakamura et al.

* cited by examiner

*Primary Examiner* — Said Bouziane
(74) *Attorney, Agent, or Firm* — Maschoff Brennan

(57) ABSTRACT

An ECU including a control circuit is provided to control driving of a motor, which outputs at least a part of torque required for steering a vehicle. The control circuit is configured to switch control modes including an ADS mode for controlling driving of the motor based on an angle command value and an EPS mode for controlling the driving of the motor based on a basic assist command value which is a torque command value. The control circuit is configured to change the calculation cycle period of at least a part of the calculations related to the driving control of the motor according to the selected control mode. Accordingly, an appropriate calculation cycle period can be set for each calculation related to the driving control of the motor according to the control mode, and the calculation load can be reduced.

10 Claims, 9 Drawing Sheets

| DRIVE MODE | (1) FAIL-SAFE | (2) EPS BASIC | (3) EPS COMPENSATION | (4) ADS BASIC | (5) ADS COMPENSATION | (6) CURRENT FB |
|---|---|---|---|---|---|---|
| EPS | ○ | ○ | ○ | × | × | ○ |
| ADS⇔EPS | ○ | ○ | △ or × | ○ | △ or × | ○ |
| ADS | ○ | △ or × | △ or × | ○ | ○ | △ |

ROTARY ELECTRIC MACHINE CONTROL DEVICE AND METHOD

CROSS REFERENCE TO RELATED APPLICATION

The present application claims the benefit of priority from Japanese Patent Application No. 2019-087444 filed on May 7, 2019. The entire disclosures of the above application are incorporated herein by reference.

FIELD

The present disclosure relates to a rotary electric machine control device and method.

BACKGROUND

A conventional steering apparatus includes an electric driving device and a steering mechanism. Another conventional control device has a function of executing each control of automatic steering control for performing automatic steering and assist control for assisting a driver's steering torque. The control device receives an automatic steering request from a high-level control unit and performs an operation checking in addition to assist control, and hence has a heavy calculation load.

SUMMARY

According to the present disclosure, a rotary electric machine control device is provided controlling driving of a motor having a motor winding. The rotary electric machine control device comprises a control circuit configured to perform a process of switching a control mode including an angle control mode and a torque control mode. The angle control is performed for controlling driving of a motor based on an angle command value. The torque control is performed for controlling the driving of the motor based on a torque command value.

DETAILED DESCRIPTION OF THE EMBODIMENT

Embodiment

Figure 1:
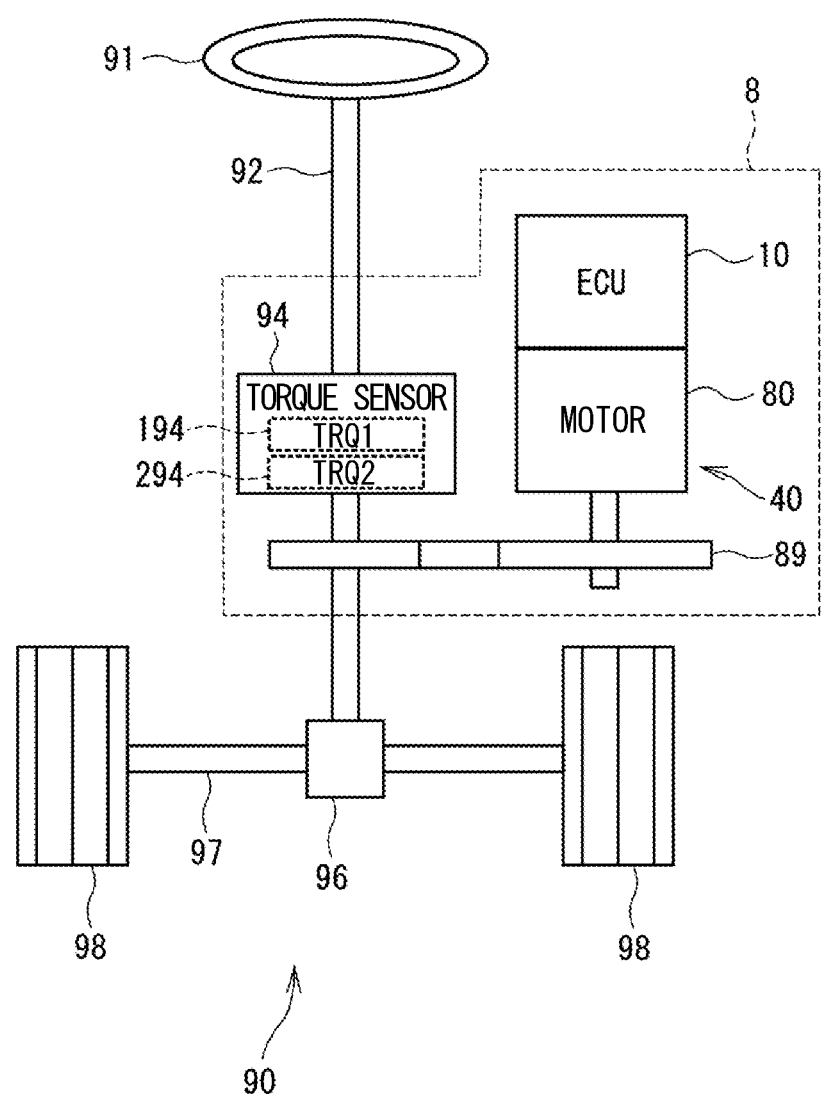
FIG. 1 is a schematic structural diagram showing a steering system including a rotary electric machine control device according to an embodiment.

Hereinafter, a rotary electric machine control device according to the present disclosure will be described with reference to the drawings. The rotary electric machine control device according to the embodiment is shown in FIG. 1 to FIG. 10. As shown in FIG. 1, an ECU 10 provided as a rotary electric machine control device is a motor control device configured to control driving of a motor 80 that is a rotary electric machine. The ECU 10 is used together with the motor 80 as an electric power steering apparatus 8 that assists a steering operation of a vehicle.

FIG. 1 shows a configuration of a steering system 90 including the electric power steering apparatus 8. The steering system 90 includes a steering wheel 91, which is a steering member, a steering shaft 92, a pinion gear 96, a rack shaft 97, a pair of road wheels 98 and the electric power steering apparatus 8.

The steering wheel 91 is connected to the steering shaft 92. A torque sensor 94 is provided on the steering shaft 92 to detect a steering torque. The torque sensor 94 has a first sensor unit 194 and a second sensor unit 294, each of which is capable of detecting its own failure. A pinion gear 96 is provided at an axial end of the steering shaft 92. The pinion gear 96 meshes with a rack shaft 97. The road wheels 98 are coupled at both ends of the rack shaft 97 via, for example, tie rods.

When a driver of the vehicle rotates the steering wheel 91, the steering shaft 92 connected to the steering wheel 91 rotates. A rotational movement of the steering shaft 92 is converted to a linear movement of the rack shaft 97 by the pinion gear 96. The road wheels 98 is steered to an angle corresponding to the displacement amount of the rack shaft 97.

The electric power steering apparatus 8 includes a reduction gear 89 and the like in addition to the motor 80 and the ECU 10. The reduction gear 89 is a power transmission mechanism that reduces the rotation of the motor 80 and transmits the reduced rotation to the steering shaft 92. The electric power steering apparatus 8 of the present embodiment is a column assist type. It may alternatively be a rack assist type that transmits the rotation of the motor 80 to the rack shaft 97. In the present embodiment, the steering shaft 92 is a driven object.

Figure 2:
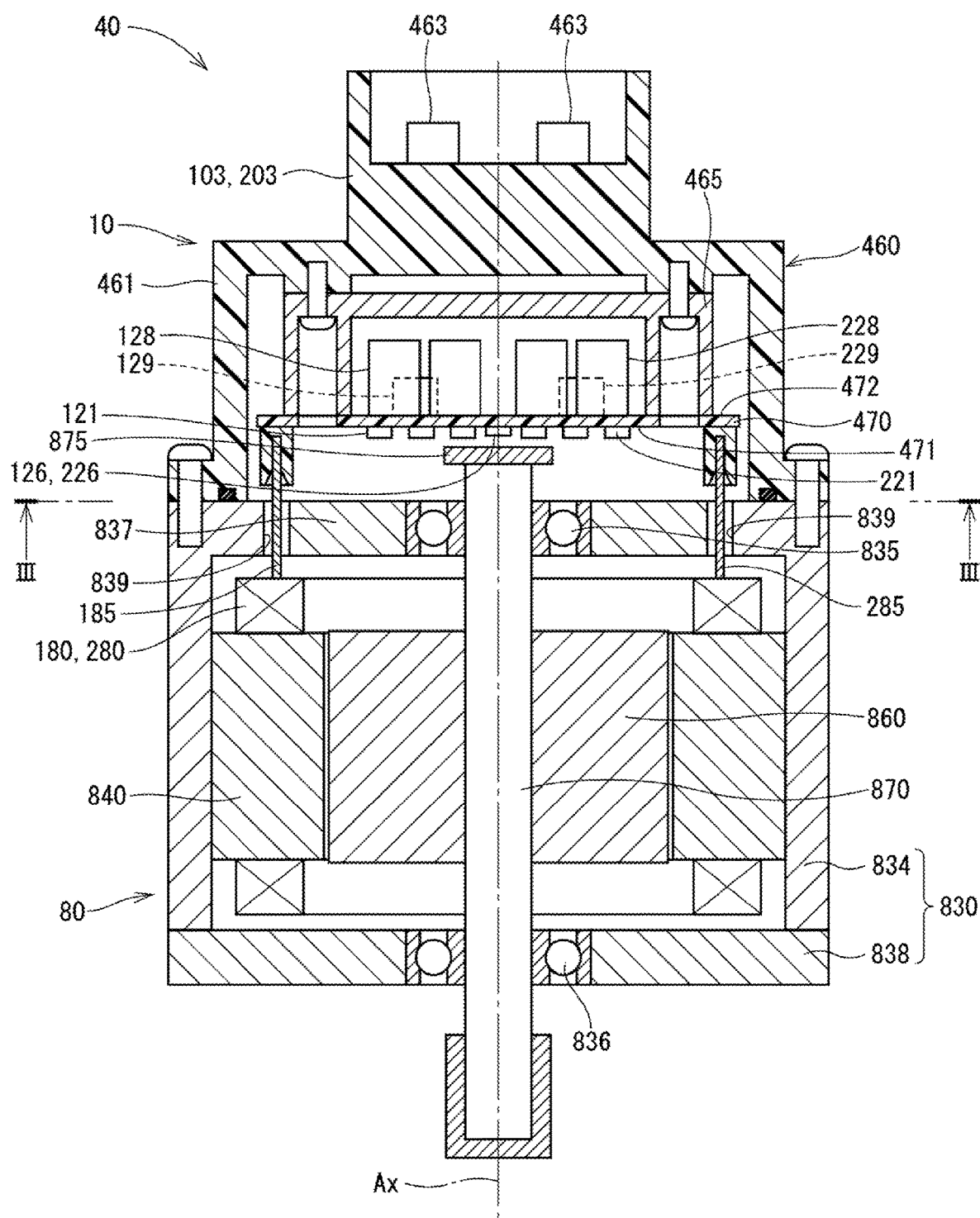
FIG. 2 is a cross-sectional view showing a driving device in the embodiment.

As shown in FIG. 1 to FIG. 4, the motor 80 outputs a whole or a part of a torque required for a steering operation. The motor 80 is driven by electric power supplied from batteries 101 and 201 provided as direct current power supplies to rotate the reduction gear 89 in forward and reverse directions. The motor 80 is a three-phase brushless motor and has a rotor 860 and a stator 840 as shown in FIG. 2.

The motor 80 has a first motor winding 180 and a second motor winding 280 as a winding set. The motor windings 180 and 280 have the same electrical characteristics and are wound about the stator 840 with electrical angles shifted from each other by 30 degrees. Correspondingly, phase currents are controlled to be supplied to the motor windings 180 and 280 such that the phase currents have a phase difference Φ of 30 degrees. By optimizing a current supply phase difference, the output torque is improved. In addition, sixth-order torque ripple can be reduced, and noise and vibration can be reduced. The noise and vibration is abbreviated as NV in the following description. In addition, since heat is also distributed and averaged by distributing the current, it is possible to reduce temperature-dependent system errors such as a detection value and torque of each sensor and increase the amount of current that is allowed to be supplied. The electrical characteristics of the motor windings 180 and 280 may be different.

Hereinafter, a combination of a first inverter circuit 120 and a first control circuit 150 and the like, which are related to the driving control for the first motor winding 180, is referred to as a first system L1, and a combination of a second inverter circuit 220 and a second control circuit 250 and the like, which are related to the driving control for the second motor winding 280, is referred to as a second system L2. The structural components related to the first system L1 are basically indicated with reference numerals of 100, and the structural components related to the second system L2 are basically indicated with reference numerals of 200. In the first system L1 and the second system L2, same or similar structural components are indicated with same reference numbers in the least significant two digits. For the other configuration described below, the term "first" is indicated with a suffix "1," and the term "second" is indicated with a suffix "2."

In the driving device 40, the ECU 10 is integrally provided on one side in the axial direction of the motor 80 in a machine-electronics integrated type. The motor 80 and the ECU 10 may alternatively be provided separately. The ECU 10 is positioned coaxially with an axis Ax of the shaft 870 on the side opposite to the output shaft of the motor 80. The ECU 10 may alternatively be provided on the output shaft side of the motor 80. By adopting the machine-electronics integrated type, it is possible to space-efficiently arrange the ECU 10 and the motor 80 in a vehicle having restricted mounting space.

The motor 80 includes the stator 840, the rotor 860 and a housing 830, which houses the stator 840 and the rotor 860 therein. The stator 840 is fixed to the housing 830 and the motor windings 180 and 280 are wound thereon. The rotor 860 is provided radially inside the stator 840 to be rotatable relative to the stator 840.

The shaft 870 is fitted firmly in the rotor 860 to rotate integrally with the rotor 860. The shaft 870 is rotatably supported by the housing 830 through bearings 835 and 836. The end portion of the shaft 870 on the ECU 10 side protrudes from the housing 830 to the ECU 10 side. A magnet 875 is provided at the axial end of the shaft 870 on the ECU 10 side.

The housing 830 has a bottomed cylindrical case 834, which has a rear end frame 837, and a front end frame 838 provided on an open side of the case 834. The case 834 and the front end frame 838 are fastened to each other by bolts or the like. Lead wire insertion holes 839 are formed in the rear end frame 837. Lead wires 185 and 285 connected to each phase of the motor windings 180 and 280 are inserted through the lead wire insertion holes 839. The lead wires 185 and 285 are taken out from the lead wire insertion holes 839 to the ECU 10 side and connected to a circuit board 470 of the ECU 10.

The ECU 10 includes a cover 460 and a heat sink 465 fixed to the cover 460 in addition to the circuit board 470 fixed to the heat sink 465. The ECU 10 further includes various electronic components and the like mounted on the circuit board 470.

The cover 460 protects the electronic components from external impacts and prevents dust, water or the like from entering into the ECU 10. In the cover 460, a cover main body 461 and connector members 103 and 203 are integrally formed. The connector members 103 and 203 may alternatively be separated from the cover main body 461. Terminals 463 of the connector members 103 and 203 are connected to the circuit board 470 via wirings (not shown) or the like. The number of connectors and the number of terminals may be changed in correspondence to the number of signals and the like. The connector members 103 and 203 are provided at the end portion in the axial direction of the driving device 40 and is open on the side opposite to the motor 80.

The circuit board 470 is, for example, a printed circuit board, and is positioned to face the rear end frame 837. On the circuit board 470, the electronic components of the first and second systems are mounted independently for each system so that the two systems are provided in a fully redundant configuration. According to the present embodiment, the electronic components are mounted on one circuit board 470. The electronic components may alternatively be mounted on plural circuit boards.

Figure 3:
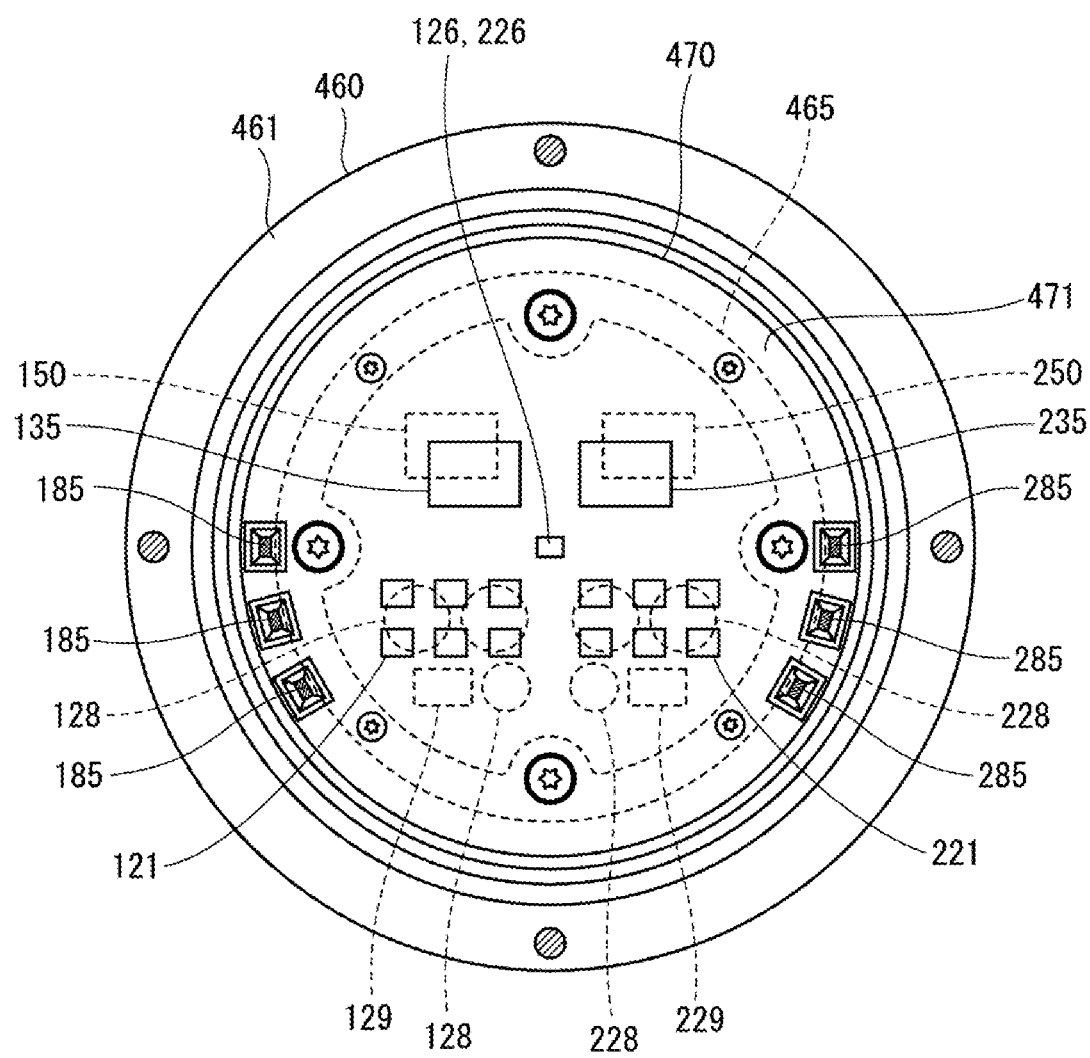
FIG. 3 is a cross-sectional view taken along a line III-III in FIG. 2.

Of the two principal surfaces of the circuit board 470, one surface on the side of the motor 80 is referred to as a motor-side surface 471 and the other surface on the side of the cover 460 is referred to as a cover-side surface 472. As shown in FIG. 3, first switching elements 121 of the inverter circuit 120, second switching elements 221 of the inverter circuit 220, rotation angle sensors 126, 226, custom ICs 135, 235 and the like are mounted on the motor-side surface 471. The rotation angle sensors 126 and 226 are mounted at positions facing the magnet 875 to detect a change in the magnetic field caused by the rotation of the magnet 875.

On the cover-side surface 472, capacitors 128, 228, inductors 129, 229, and first and second microcomputers forming the first and second control circuits 150, 250, respectively, are mounted. In FIG. 3, reference numerals 150 and 250 are assigned to the microcomputers provided as the control circuits 150 and 250, respectively. The capacitors 128 and 228 smoothen electrical power input from the batteries 101 and 201 (see FIG. 4). The capacitors 128 and 228 assist electric power supply to the motor 80 by storing electric charge therein. The capacitors 128, 228 and the inductors 129, 229 configure filter circuits, respectively, to reduce noises transmitted from other devices which share the battery, and also to reduce noises transmitted to the other devices, which share the battery, from the driving device 40. Although not shown in FIG. 3, power supply relays 122, 222, the motor relays 125, 225, current sensors 127, 227 and the like are also mounted on the motor-side surface 471 or the cover-side surface 472.

Figure 4:
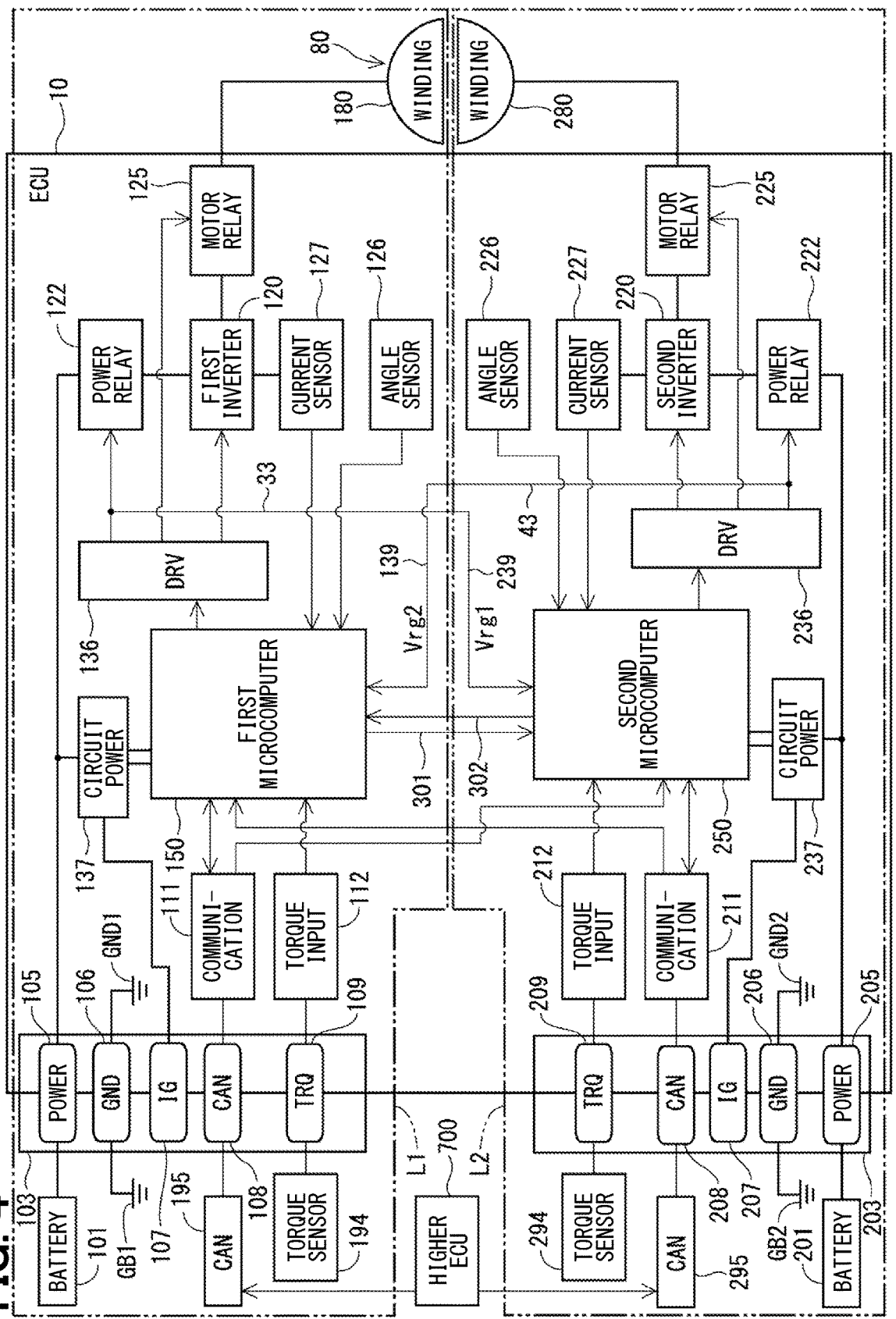
FIG. 4 is a block diagram showing an ECU in the embodiment.

As shown in FIG. 4, the ECU 10 includes the inverter circuits 120, 220 and the control circuits 150, 250. In the figure and the like, the control circuit is referred to as a microcomputer (MC). The ECU 10 is provided with the first and second connector members 103 and 203. The first connector member 103 is provided with a first power supply terminal 105, a first ground terminal 106, a first IG terminal 107, a first communication terminal 108, and a first torque terminal 109.

The first power supply terminal 105 is connected to the first battery 101 via a fuse (not shown). The electric power supplied from the positive electrode of the first battery 101 via the first power supply terminal 105 is supplied to the first motor winding 180 via the power supply relay 122, the inverter circuit 120, and the motor relay 125. The first ground terminal 106 is connected to a first ground GND1 that is a first system ground inside the ECU 10 and a first external ground GB1 that is a first system ground outside the ECU 10. In a vehicle system, a metal chassis body is a common GND plane. The first external ground GB1 indicates one of the connection points on the GND plane. The negative electrode of the first battery 101 is also connected to the connection point on the GND plane.

The first IG terminal 107 is connected to the positive electrode of the first battery 101 via a first switch that is on/off-controlled in conjunction with a vehicle start switch such as an ignition (IG) switch. The electric power supplied from the first battery 101 via the first IG terminal 107 is supplied to the first custom IC 135. The first custom IC 135 includes a first driver circuit 136, a first circuit power supply 137, a microcomputer monitor (not shown), a current monitor amplifier (not shown), and the like.

The first communication terminal 108 is connected to a first vehicle communication circuit 111 and a first vehicle communication network 195. The first vehicle communication network 195 and the first control circuit 150 are connected via a first vehicle communication circuit 111 so that signal transmission and reception are performed. Further, the first vehicle communication network 195 and the second control circuit 250 are connected so that only signal reception is performed by the second control circuit 250. Thus, even in case the second control circuit 250 fails to operate normally, the first vehicle communication network 195 including the first control circuit 150 is not affected.

The first torque terminal 109 is connected to the first sensor unit 194 of the torque sensor 94. The detection value of the first sensor unit 194 is input to the first control circuit 150 via the first torque terminal 109 and a first torque sensor input circuit 112. Here, the first sensor unit 194 and the first control circuit 150 are configured such that a failure of the torque sensor input circuit system is detected.

The second connector unit 203 is provided with a second power supply terminal 205, a second ground terminal 206, a second IG terminal 207, a second communication terminal 208, and a second torque terminal 209. The second power supply terminal 205 is connected to the positive electrode of the second battery 201 via a fuse (not shown). The electric power supplied from the positive electrode of the second battery 201 via the second power supply terminal 205 is supplied to the second motor winding 280 via the power supply relay 222, the inverter circuit 220, and the motor relay 225.

The second ground terminal 206 is connected to a second ground GND2 that is a second system ground inside the ECU 10 and a second external ground GB2 that is a second system ground outside the ECU 10. In the vehicle system, the metal chassis body is the common GND plane. The second external ground GB2 indicates one of the connection points on the GND plane. The negative electrode of the second battery 201 is also connected to the connection point on the GND plane. Here, at least different systems are configured not to connect to the same connection point on the GND plane.

The second IG terminal 207 is connected to the positive electrode of the second battery 201 via a second switch that is on/off-controlled in conjunction with the start switch of the vehicle. The electric power supplied from the second battery 201 via the second IG terminal 207 is supplied to the second custom IC 235. The second custom IC 235 includes a second driver circuit 236, a second circuit power supply 237, a microcomputer monitor (not shown), a current monitor amplifier (not shown) and the like.

The second communication terminal 208 is connected to a second vehicle communication circuit 211 and a second vehicle communication network 295. The second vehicle communication network 295 and the second control circuit 250 are connected via the second vehicle communication circuit 211 to be capable of signal transmission and reception. Further, the second vehicle communication network 295 and the first control circuit 150 are connected so that only signal reception is performed by the first control circuit 150. Thus, even in case the first control circuit 150 fails to operate normally, the second vehicle communication network 295 including the second control circuit 250 is not affected.

The second torque terminal 209 is connected to the second sensor unit 294 of the torque sensor 94. The detection value of the second sensor unit 294 is input to the second control circuit 250 via the second torque terminal 209 and the second torque sensor input circuit 212. Here, the second sensor unit 294 and the second control circuit 250 are configured such that a failure of the torque sensor input circuit system is detected.

In FIG. 4, the communication terminals 108 and 208 are connected to separate vehicle communication networks 195 and 295, respectively, but may be connected to a same vehicle communication network. Regarding the vehicle communication networks 195 and 295 in FIG. 4, CAN (controller area network) is exemplified. However, any other standard such as CAN-FD (CAN with flexible data rate) or FlexRay may be employed.

The first inverter circuit 120 is a three-phase inverter having the first switching elements 121 shown in FIG. 3 and converts electric power for the first motor winding 180. The second inverter circuit 220 is a three-phase inverter having the second switching elements 221 shown in FIG. 3 and converts electric power for the second motor winding 280.

The first power supply relay 122 is provided between the first power supply terminal 105 and the first inverter circuit 120. The first motor relay 125 is provided in each phase between the first inverter circuit 120 and the first motor winding 180. The second power supply relay 222 is provided between the second power supply terminal 205 and the second inverter circuit 220. The second motor relay 225 is provided in each phase between the second inverter circuit 220 and the second motor winding 280.

In the present embodiment, the first and second switching elements 121 and 221, the power supply relays 122 and 222, and the motor relays 125 and 225 are all MOSFETs, but other elements such as IGBTs may alternatively be used. In case that the first power supply relay 122 is configured by a switching element such as a MOSFET having a parasitic diode, it is preferred that two switching elements are connected in series so that the directions of the parasitic diodes are reversed. The same applies to the second power supply relay 222. Thereby, even when the batteries 101 and 201 are erroneously connected in the reverse direction, it is possible to prevent a reverse current from flowing. Further, the power supply relays 122 and 222 may be mechanical relays.

Operations of the first switching elements 221 (refer to FIG. 3), the first power supply relay 122 and the first motor relay 125 are on/off controlled by the first control circuit 150. Operations of the second switching elements 221 (refer to FIG. 3), the second power supply relay 222 and the second motor relay 225 are on/off-controlled by the second control circuit 250.

The first rotation angle sensor 126 detects the rotation angle of the motor 80 and outputs a detected value to the first control circuit 150. The second rotation angle sensor 226 detects the rotation angle of the motor 80 and outputs a detected value to the second control circuit 250. The first rotation angle sensor 126 and the first control circuit 150, and the second rotation angle sensor 226 and the second control circuit 250 are configured such that a failure of each rotation angle sensor input circuit system is detected.

A first current sensor 127 detects a current that is supplied to each phase of the first motor winding 180. A detection value of the first current sensor 127 is amplified by an amplifier circuit in the custom IC 135 and output to the first control circuit 150. A second current sensor 227 detects a current that is supplied to each phase of the second motor winding 280. A detection value of the second current sensor 227 is amplified by an amplifier circuit in the custom IC 235 and output to the second control circuit 250.

The first driver circuit 136 outputs driving signals to each element for driving the first switching elements 121, the first power supply relay 122 and the first motor relay 125 based on control signals from the first control circuit 150. The second driver circuit 236 outputs driving signals to each element for driving the second switching elements 221, the second power supply relay 222 and the second motor relay 225 based on control signals from the second control circuit 250.

Each of the first and second control circuits 150 and 250 is mainly composed of a microcomputer and the like, and internally includes, although not shown in the figure, a CPU, a ROM, a RAM, an I/O, a bus line for connecting these components, and the like. Processes performed by each of the control circuits 150 and 250 may be software process or may be hardware process. The software process may be implemented by causing the CPU to execute a program. The program may be stored beforehand in a memory device such as a ROM, that is, in a computer-readable, non-transitory, tangible storage medium. The hardware process may be implemented by a special purpose electronic circuit. In the present embodiment, the first control circuit 150 and the second control circuit 250 are configured such that, for example, a locked-step dual microcomputer or the like is used to and their own failures are detected.

The control circuits 150 and 250 are capable of transmitting and receiving information to and from each other by the inter-microcomputer communication. This communication is referred to as an inter-computer communication. Further, the control circuits 150 and 250 acquire an automatic operation command including a steering angle command θs* from a high-level ECU (higher ECU) 700 as an external control unit via the vehicle communication networks 195 and 295. The high-level ECU 700 is, for example, an ADS-ECU or the like that performs automatic driving control. Although FIG. 4 illustrates the high-level ECU 700 as one ECU, a plurality of high-level ECUs 700 may be provided. The control circuits 150 and 250 switch the control mode according to a command from the high-level ECU 700 or the like. The control modes include a steering assist mode in which the motor 80 is controlled according to the driver's steering torque, an automatic driving mode in which the steering angle θs is automatically controlled without driver's steering operation, and a transition mode in which the operation mode is switched from one of the steering assist mode and the automatic driving mode to the other. In the following description, the steering assist mode and the automatic driving mode are referred to simply as an EPS mode and an ADS mode, respectively.

Figure 5:
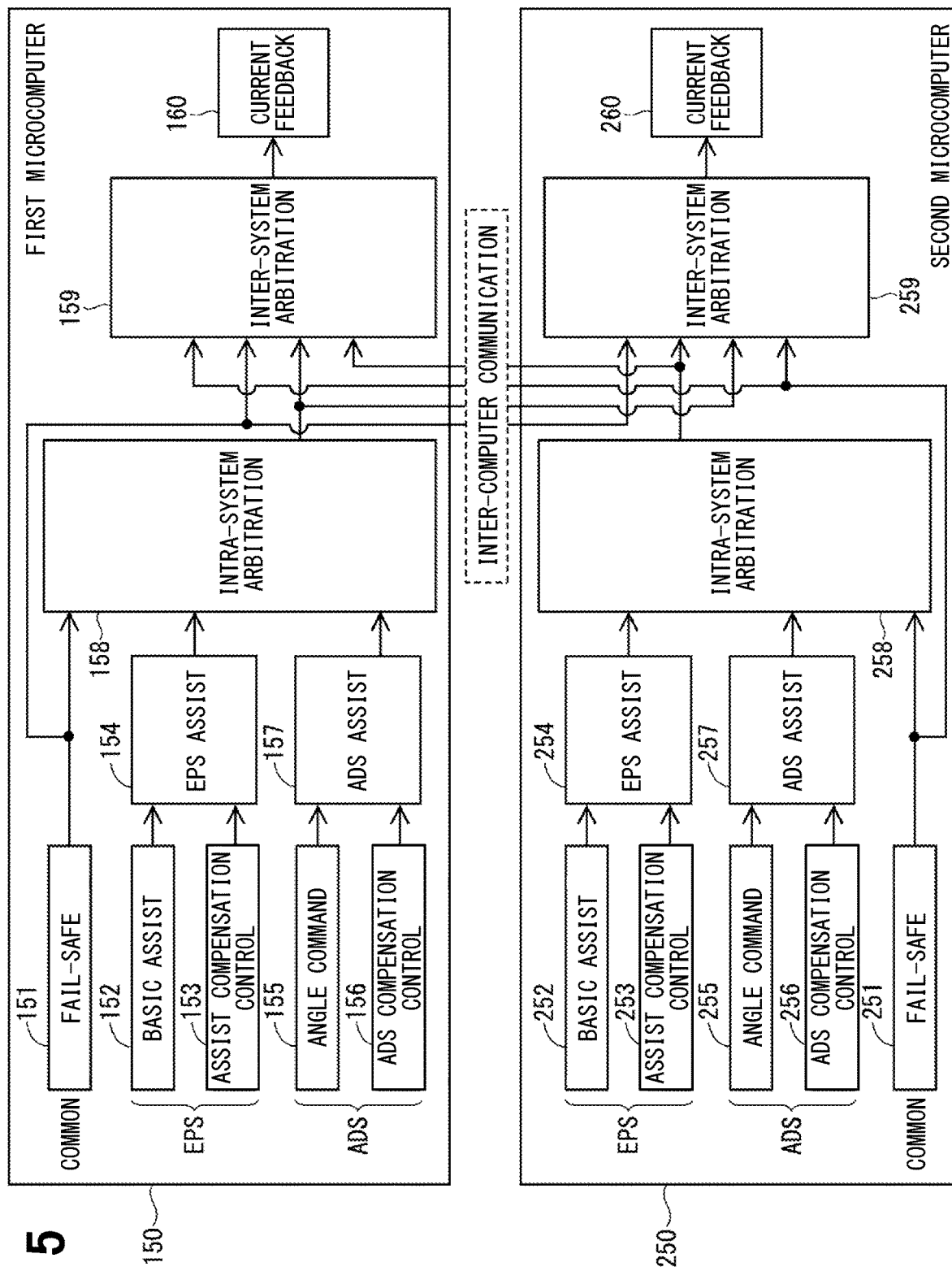
FIG. 5 is a block diagram showing a control circuit of the ECU in the embodiment.

As shown in FIG. 5, the first control circuit 150 includes a fail-safe calculation section, a basic assist calculation section 152, an assist compensation control calculation section 153, an EPS assist calculation section 154, an angle command calculation section 155, an ADS compensation control calculation section 156, an ADS assist calculation section 157, an intra-system arbitration calculation section 158, an inter-system arbitration calculation section 159, a current feedback calculation section 160, and the like.

The second control circuit 250 includes a fail-safe calculation section 251, a basic assist calculation section 252, an assist compensation control calculation section 253, an EPS assist calculation section 254, an angle command calculation section 255, an ADS compensation control calculation section 256, an ADS assist calculation section 257, an intra-system arbitration calculation section 258, an inter-system arbitration calculation section 259, a current feedback calculation section 260, and the like. The calculation in the second control circuit 250 is the same as that of the first control circuit 150, and hence the operation of the first control circuit 150 is described thereby simplifying the description of operation of the second control circuit 250.

The fail-safe calculation section 151 monitors a failure of its own system, that is, the first system such as the inverter circuit 120. Further, the fail-safe calculation section 151 monitors a communication state with the second control circuit 250 and an operation state of the second system L2. As a method for monitoring the operation state of the second system L2, it is checked whether an emergency stop has occurred by monitoring at least one state of a circuit (for example, the second inverter circuit 220, the second power supply relay 222, and the second motor relay 225), which stops the own system when an abnormality in the second system L2 is detected, or a signal line 302. In the present embodiment, an other system relay monitoring circuit 139 is provided to acquire a second relay gate signal Vrg2 output from the second driver circuit 236 to the second power supply relay 222, and monitor the state of the second power supply relay 222 based on the second relay gate signal Vrg2. The fail-safe calculation section 151 monitors the state of the ground potential of the own system and the other system.

The monitor result of the fail-safe calculation section 151 is transmitted to an intra-system arbitration calculation section 158 of the own system and an inter-system arbitration calculation section 259 of the other system. The information transmitted to the intra-system arbitration calculation section 158 of the own system may be different from the information transmitted to the inter-system arbitration calculation section 259 of the other system, for example, by omitting some information.

The basic assist calculation section 152 calculates a basic assist command value based on a steering torque, vehicle speed and the like. The assist compensation control calculation section 153 calculates an assist compensation value for compensating the basic assist command value. The assist compensation value is, for example, a value calculated so as to reduce the NV and improve steering operation feeling. The EPS assist calculation section 154 calculates an EPS current command value I_eps1* based on the assist command value and the assist compensation value.

The angle command calculation section 155 calculates an angle command value based on the steering angle command θs* acquired from the high-level ECU 700. The ADS compensation control calculation section 156 calculates an ADS compensation value for compensating the angle command value. The ADS compensation value is a value calculated to improve, for example, the travel behavior stability of the vehicle. The ADS assist calculation section 157 calculates an ADS current command value I_ads1* based on the angle command value and the ADS compensation value.

The intra-system arbitration calculation section 158 calculates an intra-system arbitration current command value I_a1* based on the monitor result of the fail-safe calculation section 151, the EPS current command value I_eps1* and the ADS current command value I_ads1*. The calculated intra-system arbitration current command value I_a1* is output to the inter-system arbitration calculation section 159 of the own system. The intra-system arbitration current command value I_a1* is output to the inter-system arbitration calculation section 259 of the other system by inter-computer communication between the microcomputers. Here, arbitration by using a current command value is exemplified, but arbitration may be performed by using a torque command value or a steering angle command value. In addition, in case of performing the fail-safe process according to the monitor result of the fail-safe calculation section 151, the intra-system arbitration calculation section 158 appropriately performs measures such as stopping the assist and gradually decreasing the assist.

Figure 6A:
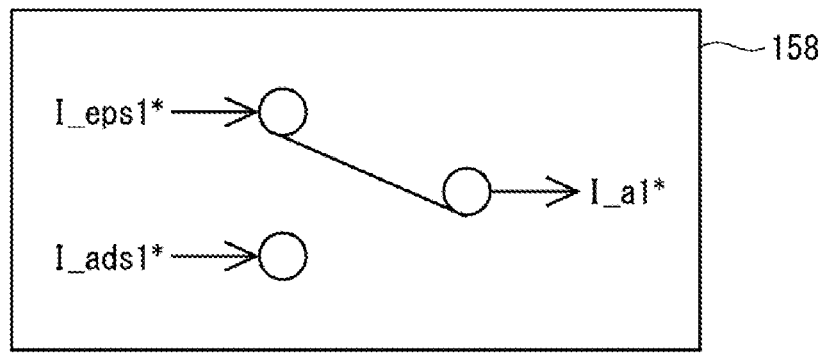
FIG. 6A, FIG. 6B and FIG. 6C are schematic diagrams illustrating configuration examples of an intra-system arbitration calculation section in the embodiment.
Figure 6B:
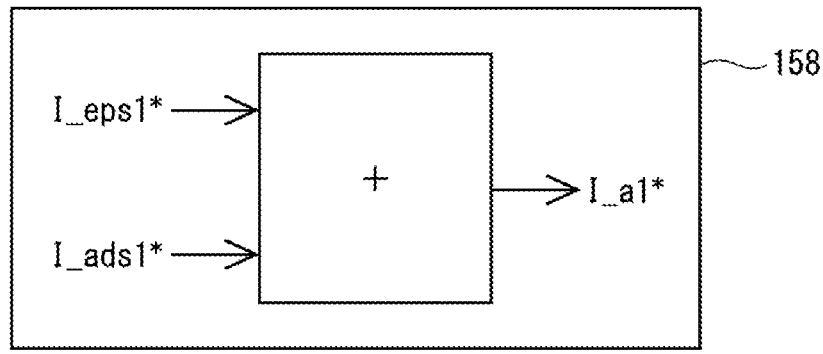
Figure 6C:
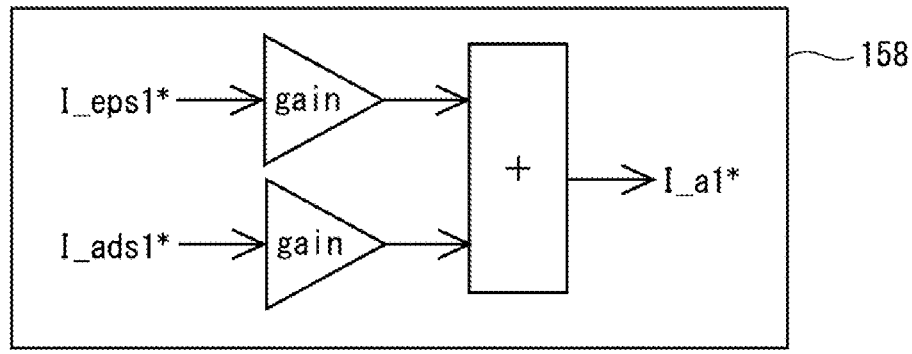

The intra-system arbitration calculation section 158 may select either the EPS current command value I_eps1* or the ADS current command value I_ads1* as shown in FIG. 6A, or add the EPS current command value I_eps1* and ADS current command value I_ads1* as shown in FIG. 6B. Further, the intra-system arbitration calculation section 158 may weight the EPS current command value I_eps1* and the ADS current command value I_ads1* with respective gains and add the weighted values as shown in FIG. 6C.

Returning to FIG. 5, the inter-system arbitration calculation section 159 calculates the inter-system arbitration current command value I1* based on the intra-system arbitration current command value I_a* of the own system, the intra-system arbitration current command value I_a2* of the other system, and the monitor results of the fail-safe calculation sections 151 and 251. In calculating the inter-system arbitration current command value I1*, one of the intra-system arbitration current command values I_a1* and I_a2* may be selected, or the intra-system arbitration current command values I_a1* and I_a2* may be added simply or added by weighting (see FIGS. 6A to 6C). The current feedback calculation section 160 performs a current feedback calculation based on the inter-system arbitration current command value I1*, and generates a control signal for controlling the on/off operation of the first switching element 121.

The basic assist calculation sections 152 and 252, the assist compensation control calculation sections 153 and 253, and the EPS assist calculation sections 154 and 254 are mainly used for control calculations in the EPS mode. The angle command calculation sections 155 and 255, the ADS compensation control calculation sections 156 and 256, and the ADS assist calculation sections 157 and 257 are mainly used for control calculations in the ADS mode. The fail-safe calculation sections 151 and 251 perform common calculations in the EPS mode and the ADS mode.

The control circuits 150 and 250 according to the present embodiment performs not only the assist control calculation for outputting an assist torque according to the driver's steering operation but also communication and arbitration between the control circuits 150 and 250, steering angle command and steering intervention from the high-level ECU 700, and the like. Thus, the calculation load tends to increase for performing more and more functions. There are restrictions on the microcomputers that can be used due to requirements such as in-vehicle security and functional safety, and hence it is desired to reduce the calculation load.

Figures 7, 8:
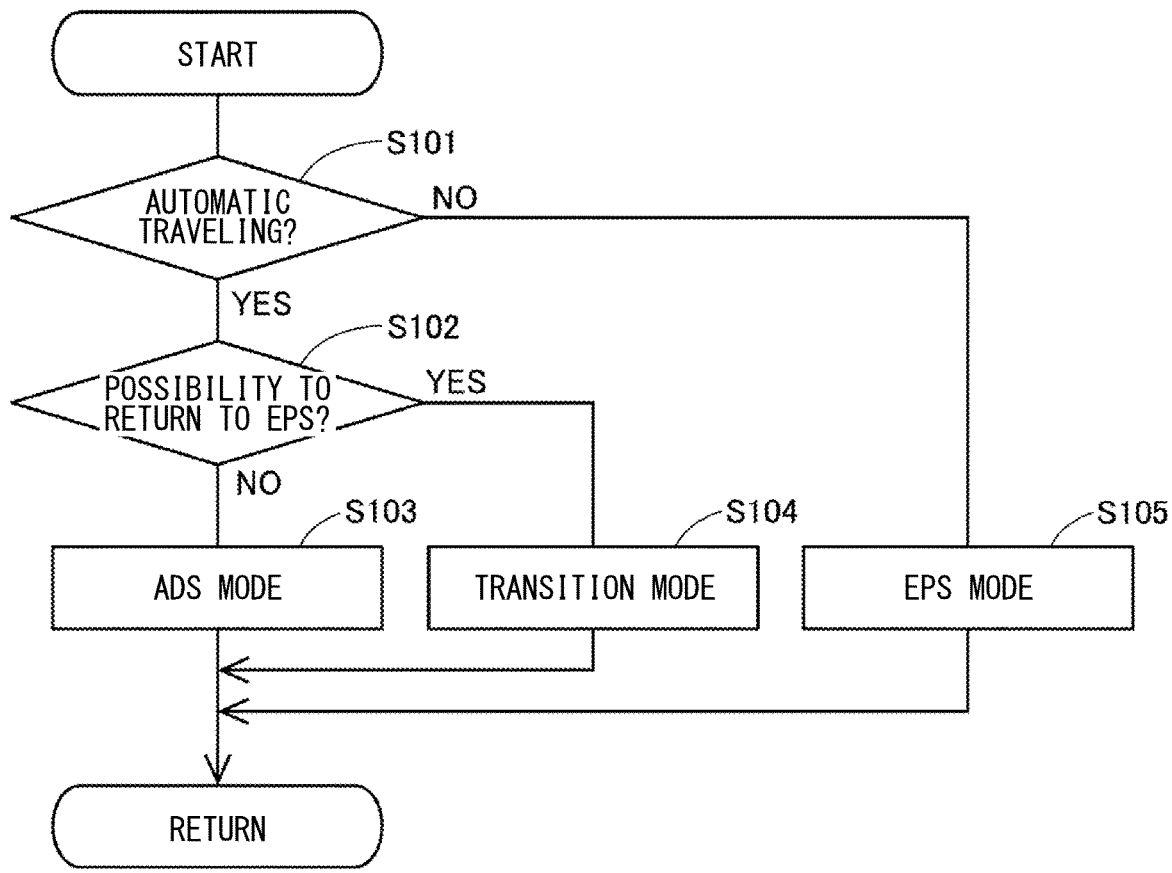
FIG. 7 is an explanatory diagram illustrating a calculation cycle period according to a control mode in the embodiment.
FIG. 8 is a flowchart illustrating a calculation switching process in the embodiment.

Therefore, in the present embodiment, the calculation load is reduced by stopping some calculations or reducing the calculation frequency (number of times of calculation per time) according to the control mode. FIG. 7 shows a calculation cycle period according to the control mode. In the figure, the transition mode is indicated as "ADS↔EPS", the calculation in the normal cycle period (normal calculation frequency) is indicated by a circle mark, the calculation in a longer calculation cycle period (lower calculation frequency) is indicated by a triangle mark, and the stop of the calculation is indicated by a cross mark ✖. In each calculation, the calculation cycle period referred to as the normal cycle period may be different. Specifically, the calculation cycle period related to the current feedback control is, for example, on the order of microseconds (μs) and the operation cycle is the shortest in order to reduce NV. Other calculations are, for example, on the order of milliseconds (ms), and the calculation cycle period is relatively long. Hereinafter, increasing the calculation cycle period corresponds to a calculation speed-down, and shortening the calculation cycle period corresponds to a calculation speed-up.

"Fail-safe calculation" is a calculation process (1) performed in the fail-safe calculation section 151. "EPS basic control" is a calculation process (2) performed in the basic assist calculation section 152. "EPS compensation control" is a calculation process (3) performed in the assist compensation control calculation section 153. "ADS basic control" is a calculation process (4) performed in the angle command calculation section 155. "ADS compensation control" is a calculation process (5) performed in the ADS compensation control calculation section 156. "Current FB calculation" is a calculation process (6) performed in the current feedback calculation section 160. In the fail-safe calculation, the calculation in the normal cycle is continued in all control modes, and the calculation cycle period is not changed.

In case the control mode is the EPS mode, the fail-safe calculation, the EPS basic control, the EPS compensation control and the current feedback control are calculated in the normal cycle, while stopping the ADS basic control and the ADS compensation control.

In case the control mode is the transition mode between ADS and EPS, the fail-safe calculation, the EPS basic control, the ADS basic control and the current feedback control are calculated in the normal cycle, while speeding down or stopping the calculations of the EPS compensation control and the ADS compensation control. By increasing the calculation cycle period and continuing the calculation at low speed, the control mode can be switched more smoothly. When the calculation is stopped, the effect of reducing the calculation load is greater.

In case that the control mode is the ADS mode, the fail-safe calculation, the ADS basic control and the ADS compensation control are calculated in the normal cycle period, and the speeds of the ESP basic control and the EPS compensation control are reduced or stopped. Further, the speed of the current feedback calculation is lowered. In the EPS mode, for example, high-speed calculation on the order of μs is performed to improve steering feeling and reduce NV. On the other hand, in the ADS mode, in case the required responsiveness is ensured and the calculation is performed in, for example, the order of ms, the load reduction effect is large. In case the current feedback control is slowed down in the ADS mode, a feedback constant may be switched to a feedback constant which emphasizes stability differently from the EPS mode.

In the ADS mode, both the EPS basic control and the EPS compensation control may be reduced in calculation speed or stopped. The calculation of the EPS basic control may be continued at the low speed, and then stopped in case that the EPS compensation control is the control for improving the steering operation feeling and reducing the NV, which are not related to the safety.

The calculation switching process will be described with reference to the flowchart of FIG. 8. This process is executed by the control circuits 150 and 250 at a predetermined cycle period. Since the processes in the control circuits 150 and 250 are basically the same, the description will be made here as the process in the first control circuit 150. In step S101, the first control circuit 150 checks whether the automatic driving is being performed. Here, a driving support may be included in the concept of automatic driving, and an affirmative determination (YES) may be made. In case it is determined that the automatic driving is not being performed (S101: NO), the process proceeds to S105. In case it is determined that the automatic driving is being performed (S101: YES), the process proceeds to S102.

In S102, the first control circuit 150 checks whether there is a possibility of returning to the EPS mode. That is, in S102, it is checked whether the automatic driving can be continued. In the present embodiment, when the steering torque is input or when the steering request is input from the high-level ECU 700, an affirmative determination (YES) is made. Regarding the steering input, it may be so determined that the steering input may be considered to be possible and an affirmative determination may be made when, for example, a driver keeps touching the steering wheel 91 or when the elapsed time from the start of the angle control is equal to or less than a predetermined time. In case it is determined that there is a possibility of returning to the EPS mode (S102: YES), the process proceeds to S104. In case it is determined that there is no possibility of returning to the EPS mode (S102: NO), the process proceeds to S103.

For example, the steering request is input from the high-level ECU 700 in the following cases. When a system error occurs in the automatic driving system, the steering request is input from the high-level ECU 700. Further, when it is determined based on the map information and the like that the vehicle is in a danger area or may deviate from the automatic driving possible area, for example, the steering request is input from the high-level ECU 700. The danger area is a place where the curvature of a road is large, or a place where traffic accidents frequently occur. The automatic driving possible area may be, for example, a road dedicated to vehicles or a road on which map data is available. Further, for example, when an obstacle is detected on the road based on monitor information of a camera or the like, the steering request is input from the high-level ECU 700. In addition, for example, when it is detected that a vehicle is deviating or likely to deviate from a traffic lane defined by white lines based on monitor information of a camera or the like, a travel locus, map data or the like, the steering request is input from the high-level ECU 700. Further, the steering request may be input based on driver monitor information indicating detected driver's line of sight. The steering request from the high-level ECU 700 may be a part or all of these, or may be made based on other information.

In S103, the first control circuit 150 sets the ADS mode, performs the ail-safe calculation, the ADS basic control, and the ADS basic control in the normal cycle period, and slows down the current feedback calculation.

In S104, the first control circuit 150 sets the transition mode, cancels the current feedback reduction process, and returns the calculation cycle period of the current feedback calculation to the normal cycle period. Further, the first control circuit 150 returns EPS basic control calculation to the calculation in the normal cycle period, and stops the ADS compensation control. That is, in this step, the first control circuit 150 performs the fail-safe calculation, the EPS basic control, the ADS basic control and the current feedback calculation in the normal cycle period.

In S105, the first control circuit 150 sets the EPS mode, stops the ADS basic control and the ADS compensation control, and returns the EPS compensation control to the calculation in the normal cycle period. That is, in this step, the fail-safe calculation, the EPS basic control, the EPS compensation control and the current feedback control are performed in the normal cycle period.

Figure 9:
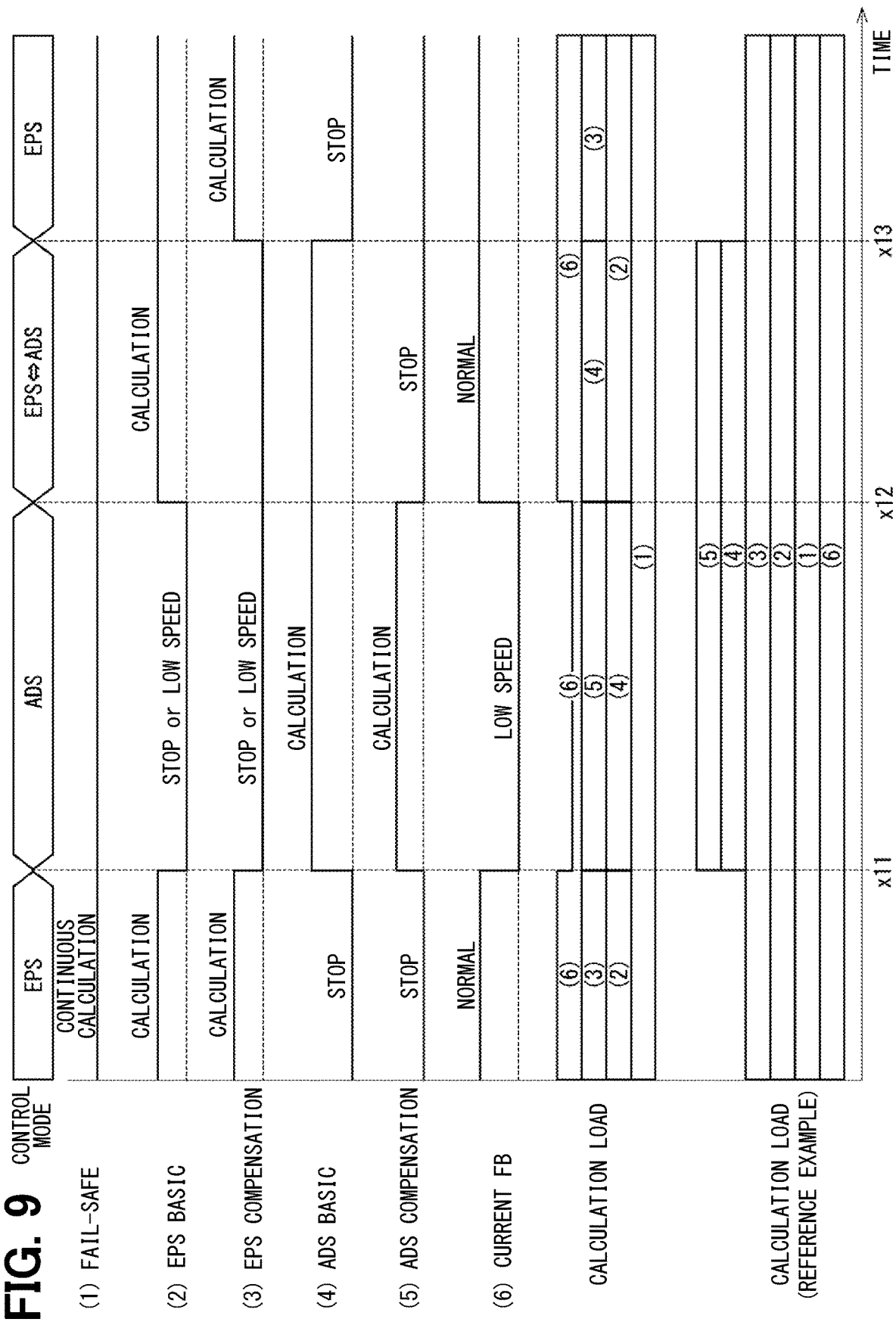
FIG. 9 is a time chart illustrating a switching operation of control modes in the embodiment.

The switching of the control mode according to the present embodiment will be described with reference to the time chart of FIG. 9. FIG. 9 shows, from the top to the bottom, the control mode, the fail-safe calculation, the EPS basic control, the EPS compensation control, the ADS basic control, the ADS compensation control, the current feedback control, the calculation load in the present embodiment and the calculation load of a reference example. In FIG. 9, for simplification of the description, the calculation loads of the control calculations of the respective control modes (1) to (6) are assumed to be the same.

Since the control mode is the EPS mode until time x11, the first control circuit 150 performs calculations for the fail-safe calculation, the EPS basic control and the EPS compensation control. In the EPS mode, the first control circuit 150 performs the current feedback calculation in the normal cycle period.

At time x11, the mode changes from the EPS mode to the ADS mode. At this time, in the reference example, the calculation load increases when the calculation performed in the EPS mode is continued as it is and the calculations of the ADS basic control and the ADS compensation control, which are the calculations in the ADS mode, are added. Therefore, in the present embodiment, in the ADS mode, the EPS basic control and the EPS compensation control are stopped, or the speed of the calculation is reduced. In FIG. 9, it is exemplified that the EPS basic control and the EPS compensation control are stopped. Further, the ADS basic control and the ADS compensation control are performed in the normal cycle period. The speed of the current feedback calculation is decreased.

When the mode changes from the ADS mode to the transition mode at time x12, the ADS compensation control is stopped, and the EPS basic control is restarted. The calculation of the current feedback control is returned to the normal cycle period. The fail-safe calculation and the ADS basic control are continued. When the control mode changes from the transition mode to the EPS mode at time x13, the ADS basic control is stopped, and the EPS compensation control is restarted. In the transition mode, the control mode may return to the ADS mode without changing to the EPS mode. In this case, the EPS basic control is stopped, the ADS compensation control is restarted, and the current feedback calculation is slowed down.

Figure 10:
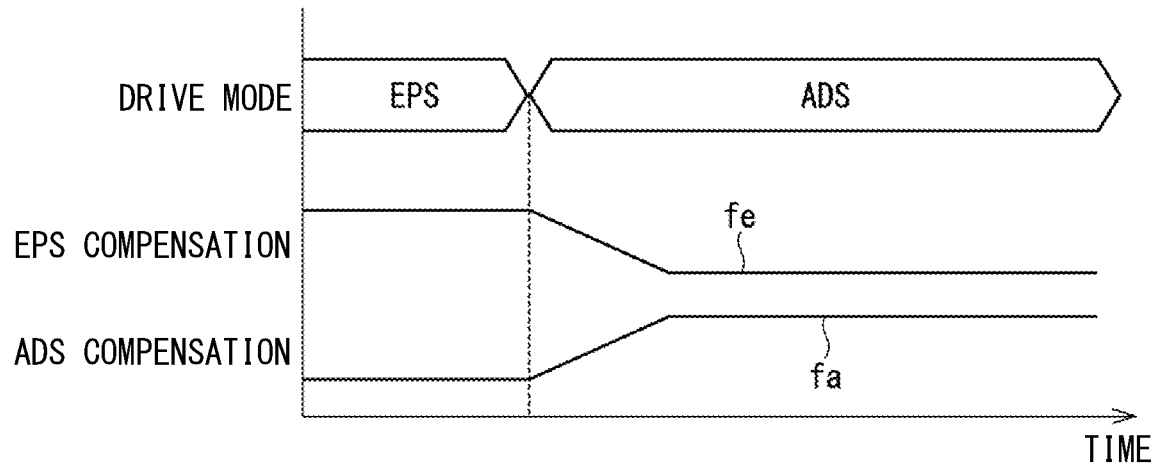
FIG. 10 is a time chart illustrating a switching of a calculation frequency in the embodiment.

As shown in FIG. 10, in case the control mode is switched to lower the calculation speed or stop the calculation, or in case the calculation speed is increased or the calculation is restarted, the calculation cycle period may be gradually changed. Here, an example in which the calculation frequency corresponding to the calculation speed changes gradually linearly is shown, but the calculation frequency may change gradually but non-linearly. FIG. 10 illustrates the calculation frequency fe of the EPS compensation control and the calculation frequency fa of the ADS compensation control at the time of switching from the EPS mode to the ADS mode. The calculation cycle period of other switching timings and other control calculations may also be gradually changed in the similar manner. Further, the calculation speed may be changed gradually or in steps depending on types of control. For example, the control related to the command calculation may be quickly switched to on and off, and the compensation control may be gradually changed.

In the present embodiment, the control to be performed and the calculation cycle period are changed according to the control mode. Thereby, the calculation load can be reduced. Further, the calculation load can be averaged regardless of the control mode. In the EPS mode, the current feedback control is calculated on the order of μs in order to reduce NV and improve steering operation feeling. On the other hand, since it is not necessary to improve the steering operation feeling during automatic driving, the calculation load of the current feedback control can be reduced by slowing down the calculation speed. Further, when a system abnormality, deviation from the traffic lane or an obstacle is detected, the calculation cycle period of the current feedback control is decreased and the calculation cycle period is returned to that of the EPS mode even during the ADS mode. As a result, the motor 80 can be controlled with good responsiveness immediately after the switching to the EPS mode.

As described above, the ECU 10 is configured to control the driving of the motor 80 that outputs at least a part of the torque required for steering the vehicle, and includes the control circuit 150, 250. The control circuit 150, 250 is configured to switch the control modes including the ADS mode for controlling the driving of the motor 80 based on the angle command value and the EPS mode for controlling the driving of the motor 80 based on the basic assist command value which is the torque command value. The control circuit 150, 250 is configured to change the calculation cycle period of at least a part of the calculations related to the driving control of the motor 80 according to the selected control mode. Here, stopping the calculation is also included in the changing of the calculation cycle period. Accordingly, an appropriate calculation cycle period can be set for each calculation related to the driving control of the motor 80 according to the control mode, and the calculation load can be reduced.

The control circuit 150, 250 are configured to include the current feedback calculation section 160, 260 that performs the current feedback calculation based on the current flowing through the motor winding 180, 280. In the ADS mode, the calculation cycle period of the current feedback calculation is made longer than in the EPS mode. In the EPS mode, the current feedback control is performed in the relatively short cycle period in order to improve the steering operation feeling and take measures against NV. On the other hand, the steering operation feeling is unnecessary in the ADS mode, and the NV is a control not directly related to safety. Therefore, in the ADS mode, the calculation cycle period of the current feedback calculation is made longer than in the EPS mode thereby to lower the calculation frequency. Thereby, the calculation load in the ADS mode can be reduced.

In case it is determined that there is a possibility of switching to the EPS control mode during the ADS mode, the calculation cycle period of the current feedback calculation section 160, 260 is changed to the calculation cycle period of the EPS mode. In the present embodiment, in case the steering torque is input during the ADS mode, or in case the steering request is input from the high-level ECU 700, it is determined that there is a possibility of switching to the EPS mode. The checking of the possibility of switching to the EPS mode may be performed in a manner other than that exemplified in the description of S102 in FIG. 8. In case there is a possibility of switching to the EPS mode, it is possible to appropriately shift to the EPS mode by returning the calculation cycle period of the current feedback control in advance. Further, it is possible to prevent a decrease in responsiveness at the start of the EPS mode by increasing the current feedback cycle period in the ADS mode.

The control circuits 150, 250 is configured to include the basic assist calculation section 152, 252 that calculates the basic assist command value that is the torque command value based on the steering torque, and the assist compensation control calculation section 153, 253 that calculates the assist compensation value that compensates for the basic assist command value. The control circuit 150, 250 is configured to stop the calculation of the assist compensation control calculation section 153, 253 in the ADS mode, or make the calculation cycle period of the assist compensation control calculation section 153, 253 longer than in the EPS mode. In addition, in the ADS mode, the calculation of the basic assist calculation section 152, 252 is stopped, or the calculation cycle period of the basic assist calculation section 152, 252 is made longer than in the EPS mode.

In the ADS mode, since the calculations of the assist compensation value and the basic assist command value are basically unnecessary, the calculation load in the ADS mode can be reduced by stopping the calculations or increasing the calculation cycle period.

The control circuit 150, 250 is configured to include the angle command calculation section 155, 255 for calculating the angle command value based on the steering angle command θs* acquired from the high-level ECU 700, and the ADS compensation control calculation section 156, 256 for calculating the ADS compensation value which compensates the angle command values. The control circuit 150, 250 is configured to stop the calculation of the ADS compensation value in the EPS mode or make the calculation cycle period of the ADS compensation control calculation section 156, 256 longer than in the ADS mode. Further, in the EPS mode, the calculation of the angle command calculation unit 155, 255 is stopped, or the calculation cycle period of the angle command calculation section 155, 255 is set longer than in the ADS mode.

In the EPS mode, the calculations of the ADS compensation value and the angle command value are basically unnecessary. Therefore, the calculation load in the EPS mode can be reduced by stopping the calculation or increasing the calculation cycle period.

In the present embodiment, the electric power steering device 8 is provided as the steering device, the ECU 10 is provided as the rotary electric machine control device. The ADS mode corresponds to the angle control mode, and the EPS mode corresponds to the torque control mode. Further, the basic assist calculation section 152, 252 is provided as the basic torque calculation section, the assist compensation control calculation section 153, 253 is provided as the torque compensation control calculation section, the ADS compensation control calculation section 156, 256 is provided as the angle compensation control calculation section, and the high-level ECU 700 is provided as the external control unit. Still further, the basic assist command value corresponds to the torque command value, the assist compensation value corresponds to the torque compensation value, the ADS compensation value corresponds to the angle compensation value, and the steering angle command θs* corresponds to the angle command.

Other Embodiment

In the above embodiment, the ADS mode corresponds to the angle control mode, and the EPS mode corresponds to the torque control mode. In another embodiment, the angle control mode is not limited to the ADS mode, but may be any control that drives the motor based on the angle command value. Further, the torque control mode is not limited to the EPS mode, but may be any control that controls the driving of the motor based on the torque command value.

In the above embodiment, two motor windings, two inverter circuits and two control circuits are provided. In another embodiment, at least one of the motor winding, the inverter circuit, and the control circuit may be one, or three or more. In the above embodiment, two systems are provided. In another embodiment, one system or three or more systems may be provided. Further, for example, one control circuit may be provided for a plurality of motor windings and inverter circuits, or a plurality of inverter circuits and motor windings may be provided for one control circuit. That is, the numbers of motor windings, inverter circuits and control circuits may be different. In the above embodiment, the power supply is provided for each system, and the ground of each system is separated. In another embodiment, one power supply may be shared by a plurality of systems. Further, a plurality of systems may be connected to the common ground.

In the above embodiment, the rotary electric machine is the three-phase brushless motor. In another embodiment, the rotary electric machine is not limited to the brushless motor, but may be any motor, and may be a motor-generator having both functions of a motor and a generator. In the above embodiment, the rotary electric machine control device is applied to the electric power steering device. In another embodiment, the rotary electric machine control device may be applied to a device such as a steer-by-wire device, which is other than the electric power steering device for steering control.

The control circuit and method described in the present disclosure may be implemented by a special purpose computer, which is configured with a memory and a processor programmed to execute one or more particular functions embodied in computer programs of the memory. Alternatively, the control circuit described in the present disclosure and the method thereof may be realized by a dedicated computer configured as a processor with one or more dedicated hardware logic circuits. Alternatively, the control circuit and method described in the present disclosure may be realized by one or more dedicated computer, which is configured as a combination of a processor and a memory, which are programmed to perform one or more functions, and a processor which is configured with one or more hardware logic circuits. The computer programs may be stored, as instructions to be executed by a computer, in a tangible non-transitory computer-readable medium. The present disclosure is not limited to the above embodiment, and various modifications may be implemented without departing from the spirit of the present disclosure.

What is claimed is:

1. A rotary electric machine control device for controlling driving of a motor having a motor winding, the rotary electric machine control device comprising:
a control circuit configured to perform a process of switching a control mode including an angle control mode and a torque control mode, the angle control mode being for controlling driving of a motor based on an angle command value and the torque control mode being for controlling the driving of the motor based on a torque command value,
wherein
the control circuit is configured to perform a process of changing a calculation cycle period of a part of calculations related to driving control of the motor based on a selected control mode between the angle control mode and the torque control mode,
the control circuit includes a current feedback calculation section for performing a current feedback calculation based on a current supplied to the motor winding, and
the control circuit is configured to increase a cycle period of the current feedback calculation performed by the current feedback calculation section in the angle control mode to be longer than that of the torque control mode.

2. The rotary electric machine control device according to claim 1, wherein:
the control circuit is configured to switch a calculation frequency of the current feedback calculation to a calculation frequency set for the torque control mode, when the control mode is determined to possibly change to the torque control mode, during the angle control mode.

3. The rotary electric machine control device according to claim 2, wherein:
the control circuit is provided in a steering device of a vehicle; and
the control circuit is configured to determine that the control mode possibly changes to the torque control mode, when a steering torque is applied to the steering device or a steering request is input from an external control unit, during the angle control mode.

4. The rotary electric machine control device according to claim 1, wherein:
the control circuit includes a basic torque calculation section for calculating a torque command value, a torque compensation control calculation section for calculating a torque compensation value, which compensates the torque command value, an angle command calculation section for calculating an angle command value based on an angle command acquired from an external control unit, and an angle compensation control calculation section for calculating an angle compensation value for compensating the angle command value;
the control circuit is configured to stop a torque compensation control calculation performed by the torque compensation control calculation section or increases a calculation cycle period of the torque compensation control calculation to be longer than that of the torque control mode, in the angle control mode; and
the control circuit is configured to stop an angle compensation value calculation performed by the angle compensation control calculation section or increases a calculation cycle period of the angle compensation value calculation to be longer than that of the angle control mode, in the torque control mode.

5. The rotary electric machine control device according to claim 4, wherein:
the control circuit is configured to stop a torque command value calculation performed by the basic torque calculation section or increases a calculation cycle period of the torque command value calculation to be longer than that in the torque control mode, in the angle control mode; and the control circuit is configured to stop an angle command value calculation performed by the angle command calculation section or increases a calculation cycle period of the angle command value calculation to be longer than that of the angle control mode, in the torque control mode.

6. The rotary electric machine control device according to claim 1, wherein:

the control circuit includes a basic torque calculation section for calculating a torque command value, and a torque compensation control calculation section for calculating a torque compensation value, which compensates the torque command value; and the control circuit is configured to stop a torque compensation control calculation performed by the torque compensation control calculation section or increases a calculation cycle period of the torque compensation control calculation to be longer than that of the torque control mode, in the angle control mode.

7. The rotary electric machine control device according to claim 6, wherein:

the control circuit is configured to stop a torque command value calculation performed by the basic torque calculation section or increases a calculation cycle period of the torque command value calculation to be longer than that in the torque control mode, in the angle control mode.

8. The rotary electric machine control device according to claim 1, wherein:

the control circuit includes an angle command calculation section for calculating an angle command value based on an angle command acquired from an external control unit, and an angle compensation control calculation section for calculating an angle compensation value for compensating the angle command value; and the control circuit is configured to stop an angle compensation value calculation performed by the angle compensation control calculation section or increases a calculation cycle period of the angle compensation value calculation to be longer than that of the angle control mode, in the torque control mode.

9. The rotary electric machine control device according to claim 8, wherein:

the control circuit is configured to stop an angle command value calculation performed by the angle command calculation section or increases a calculation cycle period of the angle command value calculation to be longer than that of the angle control mode, in the torque control mode.

10. A rotary electric machine control method for controlling driving of a motor provided in a steering device of a vehicle, the rotary electric machine control method comprising processes of:

switching a control mode including an angle control mode and a torque control mode, the angle control mode being for controlling driving of a motor based on an angle command value and the torque control mode being for controlling the driving of the motor based on a torque command value;

changing a calculation cycle period of a part of calculations related to driving control of the motor based on a selected control mode between the angle control mode and the torque control mode;

performing a current feedback calculation based on a current supplied to the motor winding; and determining that the control mode possibly changes to the torque control mode, when a steering torque is applied to the steering device or a steering request is input from an external control unit, during the angle control mode, wherein:

the process of changing a calculation cycle period increases a cycle period of a current feedback calculation performed in the angle control mode to be longer than that of the torque control mode; and the process of changing a calculation cycle switches a calculation frequency of the current feedback calculation to a calculation frequency set for the torque control mode, when the control mode is determined to possibly change to the torque control mode, during the angle control mode.

* * * * *